US012401527B2

(12) United States Patent
Walther

(10) Patent No.: US 12,401,527 B2
(45) Date of Patent: Aug. 26, 2025

(54) COMMUNICATION METHOD FOR IOT NODES OR IOT DEVICES IN A LOCAL NETWORK

(71) Applicant: PERINET GMBH, Berlin (DE)

(72) Inventor: Karsten Walther, Königs Wusterhausen (DE)

(73) Assignee: PERINET GMBH, Berlin (DE)

( * ) Notice: Subject to any disclaimer, the term of this patent is extended or adjusted under 35 U.S.C. 154(b) by 135 days.

(21) Appl. No.: 18/558,699

(22) PCT Filed: May 3, 2022

(86) PCT No.: PCT/EP2022/061746
§ 371 (c)(1),
(2) Date: Nov. 2, 2023

(87) PCT Pub. No.: WO2022/233806
PCT Pub. Date: Nov. 10, 2022

(65) Prior Publication Data
US 2024/0243930 A1   Jul. 18, 2024

(30) Foreign Application Priority Data
May 6, 2021   (DE) ............ 10 2021 111 841.7

(51) Int. Cl.
*H04L 29/06* (2006.01)
*H04L 9/08* (2006.01)
(Continued)

(52) U.S. Cl.
CPC .......... *H04L 9/3268* (2013.01); *H04L 9/0825* (2013.01); *H04L 9/3073* (2013.01)

(58) Field of Classification Search
None
See application file for complete search history.

(56) References Cited

U.S. PATENT DOCUMENTS 10,623,497 B2 *   4/2020   Thaler ................... H04W 12/35
12,210,726 B1 *   1/2025   Loo ......................... H04L 67/34
(Continued)

FOREIGN PATENT DOCUMENTS

DE   10-2019-126686 A1   4/2021
WO   WO 2020143982 A1   7/2020

*Primary Examiner* — Shin-Hon (Eric) Chen
(74) *Attorney, Agent, or Firm* — Seed Intellectual Property Law Group LLP

(57) ABSTRACT

A method is provided for communication of IoT nodes in a local network, which is connected to the Internet solely via a computer. The local network has an Ethernet network or a single pair Ethernet network. The IoT node is designed display-free and operating-element-free and has a first interface for communication with other IoT nodes in the local network. Each IoT node has a first public key and a first private key. The first private key is stored in advance or generated by the IoT node itself. IoT nodes are authenticated by the process of transmitting a request for a root certificate to a root certificate server by means of the computer, said root certificate server having at least one root certificate of the manufacturer of the IoT nodes, receiving and storing the root certificate, and using the received root certificate to check whether the IoT nodes are original and unmodified devices. The root certificate links the first public key of the IoT nodes to unique address information of the IoT node that is valid exclusively in the local network. The computer uses the stored root certificate to check whether the public key of the IoT node is signed by the manufacturer of the IoT node. The first key is checked based on a cryptographic method.

10 Claims, 3 Drawing Sheets

(51) Int. Cl.
 H04L 9/30 (2006.01)
 H04L 9/32 (2006.01)

(56) References Cited

U.S. PATENT DOCUMENTS

| | | |
|---|---|---|
| 2018/0288015 A1* | 10/2018 | Kudaraya ............ H04L 61/5092 |
| 2019/0081961 A1* | 3/2019 | Bansal .................... H04L 67/10 |
| 2019/0253243 A1 | 8/2019 | Zimmerman et al. |
| 2020/0145409 A1* | 5/2020 | Pochuev ............. H04L 63/0853 |
| 2020/0204372 A1* | 6/2020 | Ngo ...................... H04L 9/3297 |
| 2020/0259667 A1* | 8/2020 | Garnier .................. H04L 67/12 |
| 2020/0274859 A1* | 8/2020 | Melo ..................... H04L 9/0897 |
| 2021/0125143 A1* | 4/2021 | Bartlett .............. G06Q 10/0832 |
| 2021/0203491 A1* | 7/2021 | Wei ..................... H04W 12/043 |
| 2021/0377735 A1* | 12/2021 | Latour ................ H04W 12/069 |
| 2022/0247576 A1* | 8/2022 | Beekman .............. H04L 9/3247 |
| 2024/0340188 A1* | 10/2024 | Bull ..................... H04L 9/3263 |

* cited by examiner

COMMUNICATION METHOD FOR IOT NODES OR IOT DEVICES IN A LOCAL NETWORK

BACKGROUND

Technical Field

Embodiments of the invention relate to a communication method for IoT nodes or IoT devices in a local network and to a local network having a plurality of IoT nodes or IoT devices.

Description of the Related Art

To improve automation, more and more sensors and actuators are being used which are network-enabled. Such networks are referred to as the Internet of Things IoT or as the Industrial Internet of Things IIoT. Communication between the sensors and actuators is typically based on an IP protocol. These sensors and actuators can be used in a local network (Smart Home or in a factory). Alternatively, these IoT sensors and actuators can also be directly connected to the Internet.

In particular when using IoT sensors in a local network, the security of internal communication must be ensured.

In the German patent application giving rise to a right of priority, the German Patent and Trademark Office has examined the following documents: US 2020/0259667 A1 and WO 2020/143982 A1.

BRIEF SUMMARY

Some embodiments enable a communication method for IoT nodes or IoT devices in a local network with improved security.

This is achieved by a method for communication of IoT nodes or IoT devices in a local network as described herein and by a local Internet-of-Things IoT network as described herein.

Thus, a method for communication of IoT nodes or IoT devices in a local network is provided, which is at least partially connected to the Internet solely via a computer. The local network (e.g., a Local Area Network LAN) is an Ethernet network or a single pair Ethernet network. The IoT nodes or the IoT devices are designed without a display and without operating elements. They also have a first interface for communication in the local network with other IoT nodes or with the computer. Each IoT node or device has a first public cryptographic key and a first private cryptographic key. The first private key is stored in advance in the IoT node or IoT device or is generated by the latter. IoT nodes or IoT devices are authenticated in the local network by sending a request for a root certificate to a root-certificate server on the Internet by means of the computer, said root certificate server having at least one root certificate of a manufacturer of the IoT nodes or the IoT devices. The root certificate is received and stored by the computer. The computer checks whether the IoT nodes or IoT devices present in the local network are original and unmodified devices. This is carried out using the root certificate received. The root certificate is suitable for linking the first public key of the IoT nodes or the IoT devices to a unique address information of the IoT node or the IoT device. The unique address information can constitute address information that is valid exclusively in the local network. The computer uses the stored root certificate to check whether the public key of the IoT node or the IoT device is signed by the manufacturer. The first private cryptographic key of the IoT node or the IoT device is checked based on a cryptographic method.

Address information that is valid exclusively in the local network differs from the usual procedure, as identification is typically based on global (routing-enabled) addresses. However, these addresses depend on the location where they are used and therefore cannot be known to the manufacturer of the node. Therefore, attestation is only possible indirectly with the aid of the manufacturer of the IoT nodes or devices. In addition, authentication effort is increased because the routing-enabled network names are managed by the administrator and do not follow a zero configuration (ZeroConf) approach that uses only locally valid address information. A Zero Configuration network is a type of network that allows for self-configuration without human intervention. By using address information that is only valid in the local network, the IoT sensors or devices in the local network can be configured automatically and independently. For example, the unique local address information can be a Link Local Address IPV6 or a Multicast Domain Name Service network name.

The computer can be disconnected from the Internet after receiving and storing the root certificate, so that no active Internet connection is available. This allows further authentication of the IoT nodes or the IoT devices present in the local network to take place without an active Internet connection and hence anonymously. This can prevent access to the local network over the Internet and hence a potential attack on the local network.

The IoT node or the IoT device has only a first interface for communication with the network and optionally a second interface for communication with sensors or actuators that are coupled to the IoT. There is therefore no display, operating element or input element present. Settings and parameters can be changed or adjusted, for example, via a browser on the computer 130.

Some embodiments also relate to a local Internet-of-Things IoT network. The network comprises a plurality of Internet-of-Things IoT nodes or devices, which are designed to be display-free and operating-element-free and each have a first interface for communication within the local network with other IoT nodes or a computer. The network has a computer that is connected to the Internet at least part of the time. Each IoT node or device has a first public cryptographic key and a first private cryptographic key. The first private key is stored in advance or is generated by the IoT node or IoT device itself. The computer is designed to authenticate IoT nodes or IoT devices in the local network by sending a request for a root certificate from the computer to a root-certificate server on the Internet, which has at least one root certificate of a manufacturer of the IoT nodes or the IoT devices. The root certificate is received and stored by the computer, and the computer uses the root certificate received to check whether the IoT nodes or IoT devices are original and unmodified devices. The root certificate is suitable for linking the first public key of the IoT nodes or IoT devices to a unique address information of the IoT node or the IoT device that is exclusively locally valid. The computer is designed to use the stored root certificate to check whether the first public key of the IoT nodes or the IoT devices is signed by the manufacturer of the IoT node or the IoT device. The first private key of the IoT node or the IoT device is checked based on a cryptographic method.

BRIEF DESCRIPTION OF THE SEVERAL VIEWS OF THE DRAWINGS

Advantages and embodiments are elucidated below with reference to the drawing.

DETAILED DESCRIPTION

Figure 1:
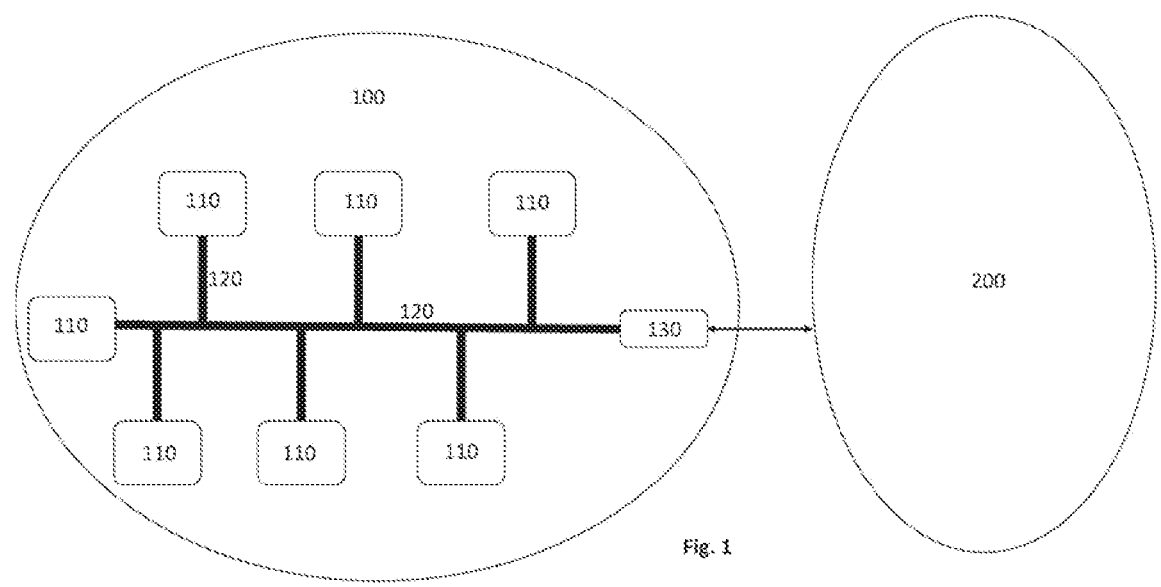
FIG. 1 shows a schematic drawing of a local network according to a first embodiment.
Figure 2:
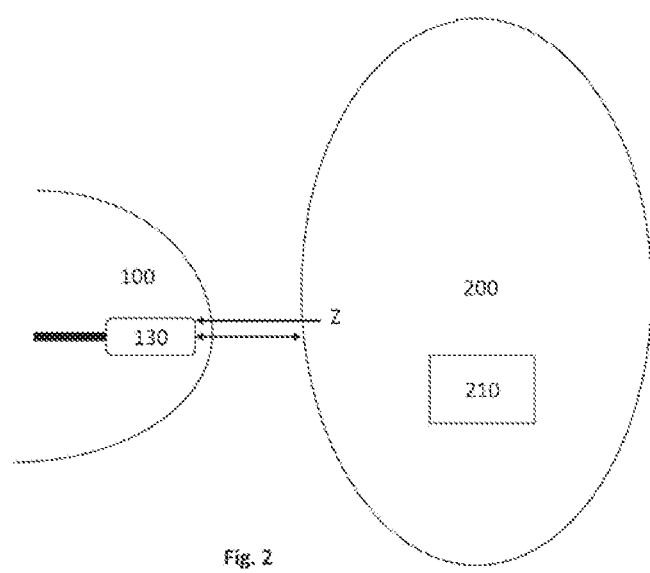
FIG. 2 shows an enlarged view of part of the local network of FIG. 1.

FIG. 1 shows a schematic drawing of a local network according to a first embodiment and FIG. 2 shows an enlarged view of part of the local network of FIG. 1. A local network 100 has a plurality of IoT (Internet of Things) nodes 110, which are connected to each other by an Ethernet network or a single pair Ethernet network 120. A computer 130 is also connected to the local network 120. The computer 130 can connect to the Internet 200. This connection to the Internet can be used, as shown in FIG. 2, to retrieve a root certificate Z for the IoT nodes 110 in the local network 100, for example, from a root-certificate server 210 of a manufacturer of the IoT nodes 110. According to the first embodiment, therefore, only the at least one computer 130 has the facility to communicate with the Internet 200 and in particular with the root-certificate server 210. The IoT nodes 110 can only communicate with other IoT nodes 110 or with the computer 130 within the local network 120. This is intended to reduce the available options for external unauthorized access to the IoT nodes.

According to the first embodiment, the at least one computer 130, which can be connected to the Internet, has sufficient mechanisms for protection against unauthorized access (e.g., firewalls, antivirus software, etc.).

The first embodiment thus relates in particular to providing the internal security of the local network 100. In particular, it should be ensured that the IoT nodes within the network 120 are original, unmodified devices. This is to prevent attacks or unauthorized access attempts from inside the local network 100. In particular, it is designated to prevent IoT nodes from accessing other IoT nodes and reading and modifying data except where this is necessary to fulfil their designated task.

According to the first embodiment, automatic authentication (in the sense of a zero configuration network) of the existing or newly added IoT nodes is to be performed. This is advantageous in particular because it does not require the use of centralized certificate-based security mechanisms. It is also possible to avoid the need to manually enter a combination of user name and password for each IoT node.

Thus, automated machine-to-machine communication can also be enabled in local networks with a very high number of IoT nodes 110.

According to the first embodiment, an automatic facility for authenticating the IoT nodes 110 within the local network 100 will be enabled, without the need for a continuous active Internet connection, for example to a root certificate server 210. This is achieved by relocating all security mechanisms into the local network without the need for an active Internet connection during authentication. For this purpose, the at least one computer 130 establishes an active Internet connection to a root certificate server 210 and sends a request for a root certificate from the manufacturer of the IoT nodes 110. The root certificate Z can be stored on the computer 130. The certificate Z can be installed in a browser on the computer 130. The active Internet connection can then be disconnected so that the local network 110 or the computer 130 is disconnected from the Internet 200.

The IoT nodes or IoT devices are display-free and operating-element-free devices. This can reduce the costs of the IoT nodes or IoT devices. The IoT nodes or IoT devices can be activated only via the local network. For example, parameters can be set using a browser on the computer 130.

Figure 3:
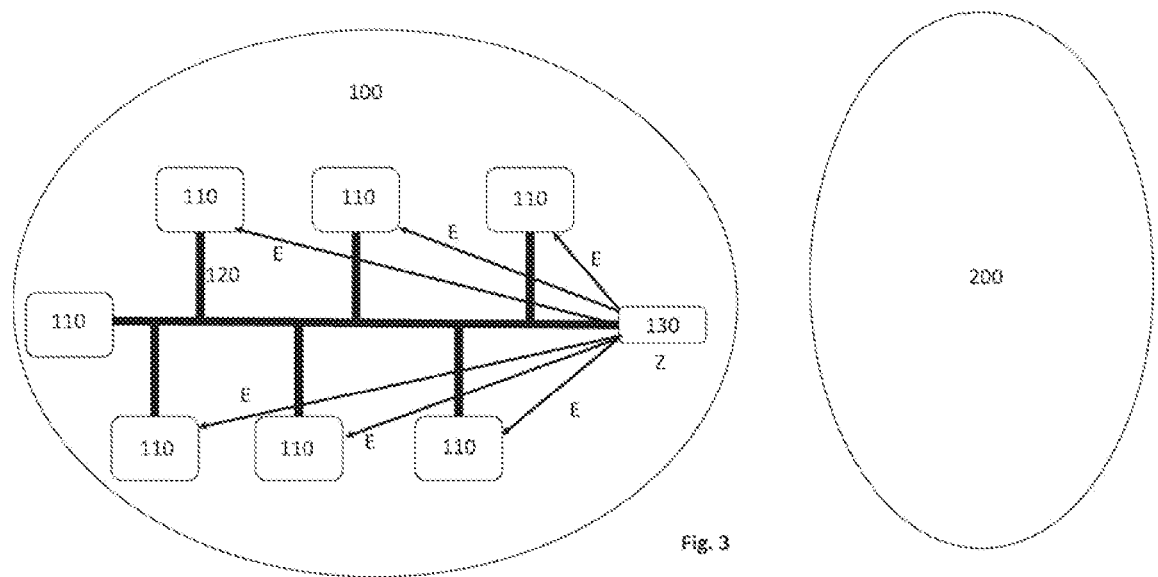
FIG. 3 shows a schematic drawing of the local network of FIG. 1 during the verification of the IoT nodes present in the local network.

FIG. 3 shows a schematic drawing of the local network of FIG. 1 during the checking of the IoT nodes 110 present in the local network. After the active Internet connection of the computer 130 to the Internet 200 has been disconnected, the computer 130 can check the IoT nodes 110 in the local network 100. In doing so, the computer 130 can first verify an authenticity E, i.e., it is checked whether the IoT nodes 110 present are original and unmodified IoT nodes 110 or IoT devices.

Each of the IoT nodes 110 is assigned a first public cryptographic key and a first private cryptographic key. The first private cryptographic key of the IoT nodes 110 can be stored or installed in the IoT node 110 by the manufacturer during manufacture of the device. This first private key can be stored in such a way that it can no longer be changed. Alternatively, the IoT node 110 may be designed to generate this first private cryptographic key itself. Each IoT node 110 is also provided with unique address information by the manufacturer during manufacture. This unique address information can be a device name that is valid exclusively in the local network. For example, the unique local address information can be a Link Local Address IPV6 or a Multicast Domain Name Service network name.

To check the IoT node 110, the browser of the computer 130 can use the installed root certificate Z to check whether the public key of the IoT node 110 has been signed by the manufacturer of the IoT nodes 110. For example, a Transport Layer Security TLS method can be used to prove, based on the first private key, that the IoT node 110 is an original device. The advantage of the authentication of the IoT nodes 110 as described above is that this can be carried out without an active Internet connection and can therefore be carried out anonymously and offline.

This ensures a device attestation, i.e., a verification of the IoT nodes 110.

Figure 4:
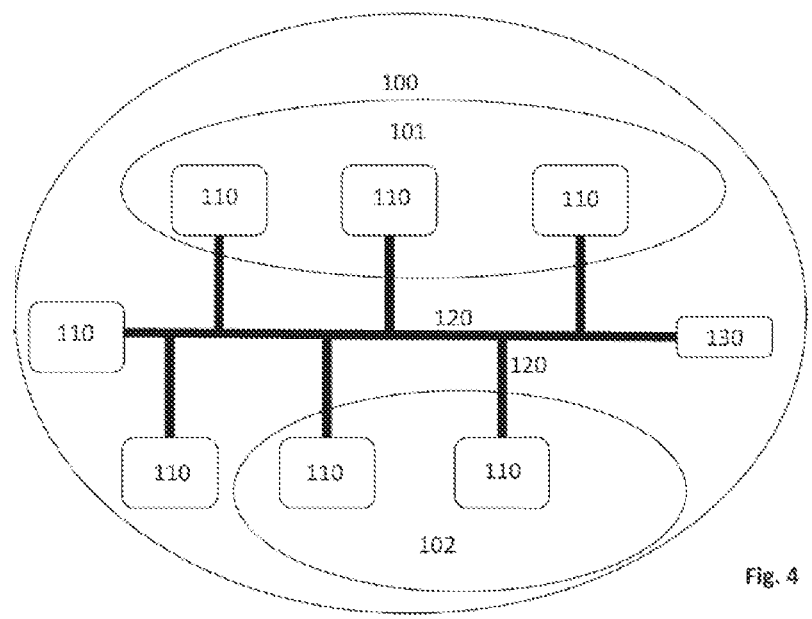
FIG. 4 shows a schematic drawing of a local network according to a second embodiment.

FIG. 4 shows a schematic drawing of a local network according to a second embodiment. The local network 100 according to the second embodiment may be based on the local network 100 according to the first embodiment of FIG. 1. Thus, a plurality of IoT nodes 110 are connected to one another and to a computer 130 via a network 120. In the second embodiment, the IoT nodes 110 which functionally belong together are to be merged into virtual local networks 101, 102. This is carried out by means of a local public key infrastructure PKI. The first virtual local network 101 can thus represent a first local public key infrastructure PKI 1. The second virtual local network 102 can represent a second public key infrastructure PKI 2. These virtual local networks can be assembled according to the required application. According to the second embodiment, a second cryptographic key pair can be generated in the IoT node 110 or loaded on to the IoT node 110. The key pair can be signed by means of a certificate for a local root public key infrastructure entity. If an IoT node 110 acts as a server in the desired application, then the PKI certificate can be used as the host certificate. The use of this host certificate allows other IoT nodes 110 in the network to verify the identity of the node and establish encrypted communication if necessary.

In another example, based on the second embodiment, the IoT node 110 can act as both a server and a client. Here, the IoT node 110 can act, for example, as a Message Queuing Telemetry Transport MQTT subscriber/publisher (client) or broker (server) or http server. Here, a user certificate can be generated for the IoT node 110 based on the cryptographic key pair, which the local PKI root signs and which can be stored on the IoT node 110. The certificate of such a PKI root can then optionally be stored as a trusted root certificate on the other IoT node 110. This allows an automatic connection to be established between the IoT nodes 110 in the local network 100. Here it is advantageously possible for the IoT nodes 110 which establish the connection to be able to authenticate one another and establish encrypted communication. In particular, it allows automated authentication and connection establishment without the need for the local network to be connected to the Internet and without the need for an administrator to intervene in the process.

According to the second embodiment, a local PKI may be provided for M2M (machine-to-machine) communication based on mTLS (Mutual Transport Layer Security).

According to one aspect of the second embodiment, rights management can be provided for the communication of the IoT nodes 110. Thus, it can be specified which of the IoT nodes 110 can read data, modify data, create new data or configure a server within the local network 100. Each IoT node 110 can have a client certificate in which its permissions are stored. These permissions can be checked by a server (IOT node 110 acting as a server).

The second embodiment can be used for machine-to-machine communication and/or for communication between a machine and a human user or between two human users. For example, a human user can identify him/herself by means of a device (Secure Stick) independently of the IoT nodes 110 used within the local PKI structure.

The local root PKI entity can constitute an IoT node 110. Thus, such an IoT node 110 can automatically monitor the checking of other IoT nodes 110 in the local network 100 or the inclusion of new IoT nodes 110 in the local network 100.

Multiple virtual local networks may be provided, which may also overlap in order to be able to run multiple applications in the local network 100. A separate PKI root can be used for each application. A virtual local network 101, 102 can therefore be provided for each PKI root. This is advantageous because it allows separation of the respective applications based on the virtual local networks 101, 102.

The addition of a new node to a virtual local network of a management node can be carried out semi-automatically. The management node can alert the user to unassigned nodes. The user can decide whether or not to select such a node. Once the new node is selected, the management node can automatically assign or ignore the node, as described above.

One of the IoT nodes 110 performs a reset when it receives a reset request by means of a special packet received on the media access layer. Such a packet is typically invalid, but may contain individual information about the node. Advantageously, in an IP protocol-based local network, it is possible to send such packets to the IoT node only if the user is connected to the IoT node directly without intermediate stations such as switches. This is due to the fact that such packets are not forwarded by a switch. This makes it a simple matter to ensure that a reset request is only possible if the user also has actual physical access to the node. For example, in an Ethernet network with a 100 Base T1 cable the maximum distance from the node is 15 m.

Thus, it is possible to react to a loss of the certificate stored on the computer 130. This can happen, for example, if the computer 130 is defective. If access to the required certificate is no longer possible, the local PKI structure must be reconfigured. In the prior art, this is possible by pressing a reset button on the IoT node or by transmitting a corresponding reset command (unencrypted). However, the use of an unencrypted reset command is not desirable from a security point of view, as this means that the local network can be reset by an unauthorized person. Furthermore, the use of a reset button on the IoT node is associated with additional costs, which are designed to be avoided.

The IoT node has neither a display nor operating elements nor a reset button. The IoT node only has a first interface for communicating with the network 120. A second interface can be used to communicate with devices that are connected to the IoT node 110.

With the reset function it can be ensured that an attacker cannot reset the IoT nodes 110 in the local network 100 via the Internet. Instead, the reset command or prompt must be sent from a device that is physically directly connected to the IoT node 110 to be reset via a network cable. The reset request thus represents a virtual reset button.

Figure 5:
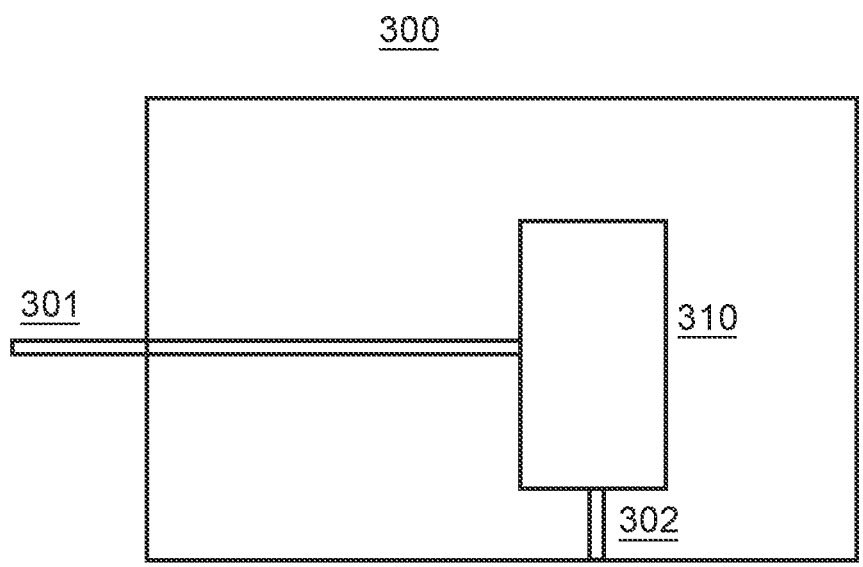
FIG. 5 shows a schematic drawing of a reset unit according to one embodiment.

FIG. 5 shows a schematic drawing of a reset unit according to one embodiment. The reset unit 300 has an internal power supply 310, for example in the form of a battery or an accumulator unit. The reset unit 300 has a first interface 301, for example, for connecting to a single pair Ethernet hybrid cable. The reset unit 300 has a second interface 302 in the form of a USB charging port. The power supply 310 can be recharged via this USB charging port 302. By means of the reset unit 300, which can be connected to an IoT node 110 or provided in an IoT node, the IoT node can be reset by means of the reset unit 300. This can be carried out, for example, if invalid states of the lines occur in a single pair Ethernet hybrid connection. An example of such invalid states is an excessively low supply voltage with the simultaneous absence of a TI link. The IoT node 110 must then be disconnected from the network 120 and connected to the reset unit 300. This in turn requires physical access to the IoT node 110. In this case, the original single pair Ethernet hybrid cable, for example, is removed from the IoT node 120 and the node is connected to the reset unit 300. The reset unit 300 then functions as a power supply for the IoT node 110 and can initiate the reset. The reset unit 300 then deletes all second certificates and key pairs installed/generated during operation as well as other information on the IoT node 110 and the node must be re-integrated by the management node with a root certificate. With regard to the security feature "Obtaining access rights by fraud," the use of second key pairs generated on the IoT node is particularly advantageous, because these cannot be restored after a reset. Furthermore, after the reset, the IoT node 110 must always be re-integrated into a virtual local network, which means the operator of the virtual local network always has knowledge of the reset operation.

By performing the reset, all key pairs of the node as well as certificates can be deleted. As a result, the IoT node cannot be logged on to a server of the local PKI structure, nor can a client access this reset IoT node. This ensures that a firmware reset or a resulting possibility of unauthorized access to the local network cannot be carried out unnoticed. Instead, the node must be reintroduced into the network environment.

According to one aspect, a method for secure local communication of network-enabled IoT nodes within a local network is provided. The network-enabled IoT nodes can be configured or installed using cryptographic methods and two cryptographic key pairs. This allows anonymous configuration of secure communication in a local network. A key pair can be generated during the production of the IoT nodes or during commissioning. The two key pairs can be verified by means of a certificate with a network address that is assigned during production and is valid in each local network.

According to one aspect, the authenticity of an IoT node can be verified using local address information (for example, an mDNS hostname) and a device-specific private key.

According to one aspect, a reset of the IoT nodes or IoT devices provided in the local network can be carried out by sending special packets to the IoT nodes on the media access layer. This is advantageous because it can prevent attacks such as Denial of Services.

According to one aspect, a reset unit can be provided in or on an IoT node that does not require a reset button. A reset command can be issued via a first interface of the reset unit, which is coupled with a single pair Ethernet hybrid cable. A reset can be performed by receiving a special packet or by detecting invalid line states.

According to one aspect, the IoT nodes can be network-enabled Smart Home devices or devices of a building automation system.

The invention claimed is:

1. A method for communication of IoT nodes or IoT devices in a local network, which is at least temporarily connected to the Internet solely via a computer, wherein the local network is an Ethernet network or a single pair Ethernet network, wherein the IoT nodes or the IoT devices are display-free and operating-element-free and have a first interface for communication in the local network with other IoT nodes or with the computer, wherein each IoT node or each IoT device has a first public cryptographic key and a first private cryptographic key, the first private key being stored in advance or generated by the IoT node or the IoT device itself, the method comprising:
  authenticating the IoT nodes or the IoT devices in a local network by:
    sending a request for a root certificate to a root-certificate server on the Internet by the computer, said root-certificate server having at least one root certificate from a manufacturer of the IoT nodes or the IoT devices,
    receiving and storing the root certificate by the computer, and
    checking, by the computer, whether the IoT nodes or IoT devices are original and unmodified devices by using the received root certificate, wherein the root certificate links the first public key of the IoT nodes or IoT devices to unique address information of each respective IoT node or IoT device that is valid exclusively in the local network,
  wherein the computer uses the stored root certificate to check whether the public key of each respective IoT node or IoT device is signed by the manufacturer of the respective IoT node or IoT device,
  wherein the first private key of the respective IoT node or IoT device is checked based on a cryptographic method.

2. The method for communication of IoT nodes or IoT devices in a local network according to claim 1, wherein: after receiving the root certificate from the root-certificate server, the computer disconnects from the Internet before the IoT nodes or the IoT device are checked.

3. The method for communication of IoT nodes or IoT devices in a local network according to claim 1, wherein:
  each IoT node or IoT device has a local and unique host name.

4. The method for communication of IoT nodes or IoT devices in a local network according to claim 1, further comprising:
  integrating at least some of the IoT nodes or IoT devices into a virtual local network in the form of a local public-key infrastructure,
  wherein each of the at least some of the IoT nodes or IoT devices is assigned a second cryptographic key pair.

5. The method for communication of IoT nodes or IoT devices in a local network according to claim 1, further comprising:
  resetting an IoT node or an IoT device by a reset unit, which has a first interface connected to a single pair Ethernet hybrid cable, wherein the reset unit resets the IoT node or the IoT device if invalid states occur on the single pair Ethernet hybrid line.

6. The method for communication of IoT nodes or IoT devices in a local network according to claim 1, wherein:
  at least one of the IoT nodes or one of the IoT devices has a client certificate in which usage rights of the IoT node or the IoT device are stored.

7. The method for communication of IoT nodes or IoT devices in a local network according to claim 1, wherein:
  each IoT node or IoT device of the plurality of IoT nodes or IoT devices has a local and unique IPv6 link local address or a multicast domain name system mDNS network name.

8. The method for communication of IoT nodes or IoT devices in a local network according to claim 1, wherein:
  at least one of the IoT nodes or IoT devices has a client certificate in which usage rights, including read or write rights, or both, of the at least one of the plurality of IoT nodes or IoT devices are stored.

9. A Local Internet-of-Things IoT network, comprising:
  a plurality of IoT nodes or IoT devices, which are display-free and operating-element-free and each have a first interface for communication in the local network with other IoT nodes or a computer in the local network, and
  at least one computer which is at least temporarily connected to the Internet,
  wherein each IoT node or each IoT device of the plurality of IoT nodes or IoT devices has a first public cryptographic key and a first private cryptographic key, the first private key being stored in advance or generated by the IoT node or the IoT device itself,
  wherein the computer is designed to authenticate IoT nodes or IoT devices in a local network by:
    sending a request for a root certificate, by the computer, to a root-certificate server on the Internet, said root-certificate server having at least one root certificate of a manufacturer of the plurality of IoT nodes or IoT devices,
    receiving and storing the root certificate, by the computer, and
    checking, by the computer, whether the plurality of IoT nodes or IoT devices are original and unmodified devices by using the received root certificate,
  wherein the root certificate links the first public key of the plurality of IoT nodes or IoT devices to unique address information of a respective IoT node or the IoT device of the plurality of IoT nodes or IoT devices that is valid exclusively in the local network, wherein the computer is designed to use the stored root certificate to check whether the first public key of the respective IoT node or the IoT device is signed by the manufacturer of the respective IoT node or the IoT device, wherein the first private key of the respective IoT node or the IoT device is checked based on a cryptographic method.

10. The Local Internet-of-Things IoT network according to claim 9, further comprising:

at least one reset unit which has a first interface, by which the reset unit is coupled to a single pair Ethernet hybrid line, wherein the reset unit is configured to reset a connected IoT node or a connected IoT device if invalid states occur on the single pair Ethernet hybrid line.

* * * * *